United States Patent

Bouffay et al.

[11] Patent Number: 5,853,242
[45] Date of Patent: Dec. 29, 1998

[54] PORTABLE TORCH WITH A CLIP-ON SUPPORT PLATE

[75] Inventors: Boris Bouffay, Grenoble; Paul Petzl, Barraux, both of France

[73] Assignee: Zedel, Crolles, France

[21] Appl. No.: 959,526

[22] Filed: Oct. 28, 1997

[30] Foreign Application Priority Data

Nov. 5, 1996 [FR] France .................................. 96 13699

[51] Int. Cl.[6] ..................................................... F21L 11/00
[52] U.S. Cl. ..................... 362/191; 362/105; 362/106; 362/396
[58] Field of Search .................................. 362/105, 106, 362/108, 190, 191, 396

[56] References Cited

U.S. PATENT DOCUMENTS 3,912,919  10/1975  Eriksson .
4,360,930  11/1982  Blanchard ............................... 362/105
4,400,763   8/1983  Kribs et al. ............................. 362/103

FOREIGN PATENT DOCUMENTS

A-2 628 182  9/1989  France .

*Primary Examiner*—Stephen F. Husar
*Attorney, Agent, or Firm*—Oliff & Berridge, PLC

[57] ABSTRACT

A torch light comprises an elongate case and fixing means to enable it to be used as a head-mounted lamp. The fixing means comprise a fixing plate designed to cooperate by clipping with locking means provided in a blind orifice of the case and arranged to constitute positive locking of the fixing plate in the active position, switching of said locking means from the active position to the inactive position requiring a manual unlocking operation to uncouple the case from the fixing plate. A head-mounted lamp can thus be quickly transformed into a torch light.

6 Claims, 5 Drawing Sheets

5,853,242

PORTABLE TORCH WITH A CLIP-ON SUPPORT PLATE

BACKGROUND OF THE INVENTION

The invention relates to an electric torch light comprising
an elongate case containing a current source to supply a bulb,
a reflector and screen assembly securedly affixed to a rotating ring screwed onto a threaded end of the case opposite the base,
and fixing means associated to the body of the case to enable the torch light to be used as a head-mounted lamp.

Certain torch lights can be used as head-mounted lamps by means of a band fixed around the head. The band is provided with an elastic attachment enabling the lamp to be inserted. The use of such a band means that the lamp has to be positioned on the lateral side of the user's head. Such a band does not enable the lamp to be used for other applications, for example fixing onto a bicycle frame.

SUMMARY OF THE INVENTION

The object of the invention is to achieve a torch light with universal fixing independent from the support, and enabling a head-mounted lamp to be quickly transformed into a torch light.

The torch light according to the invention is characterized in that the fixing means comprise a fixing plate designed to cooperate by clipping with locking means provided in a blind orifice of the case and arranged to constitute positive locking of the fixing plate in the active position, moving said locking means from the active position to the inactive position requiring a manual unlocking operation to uncouple the case from the plate, and that the locking means comprise a pair of securing buttons located on the two opposite sides of the orifice and designed in said active position to block two latching studs securedly affixed to the fixing plate.

According to one feature of the invention, the bottom lateral surface of the case extending between the circular end and the base presents a curved profile with a decreasing cross-section in the direction of the base.

The curved shape of the elongate case enables the torch to be worn in the middle zone and above the head.

BRIEF DESCRIPTION OF THE DRAWINGS

Other advantages and features will become more clearly apparent from the following description of an embodiment of the invention, given as a non-restrictive example only, and represented in the accompanying drawings, in which.

DETAILED DESCRIPTION OF THE PREFERRED EMBODIMENT

Figure 1:
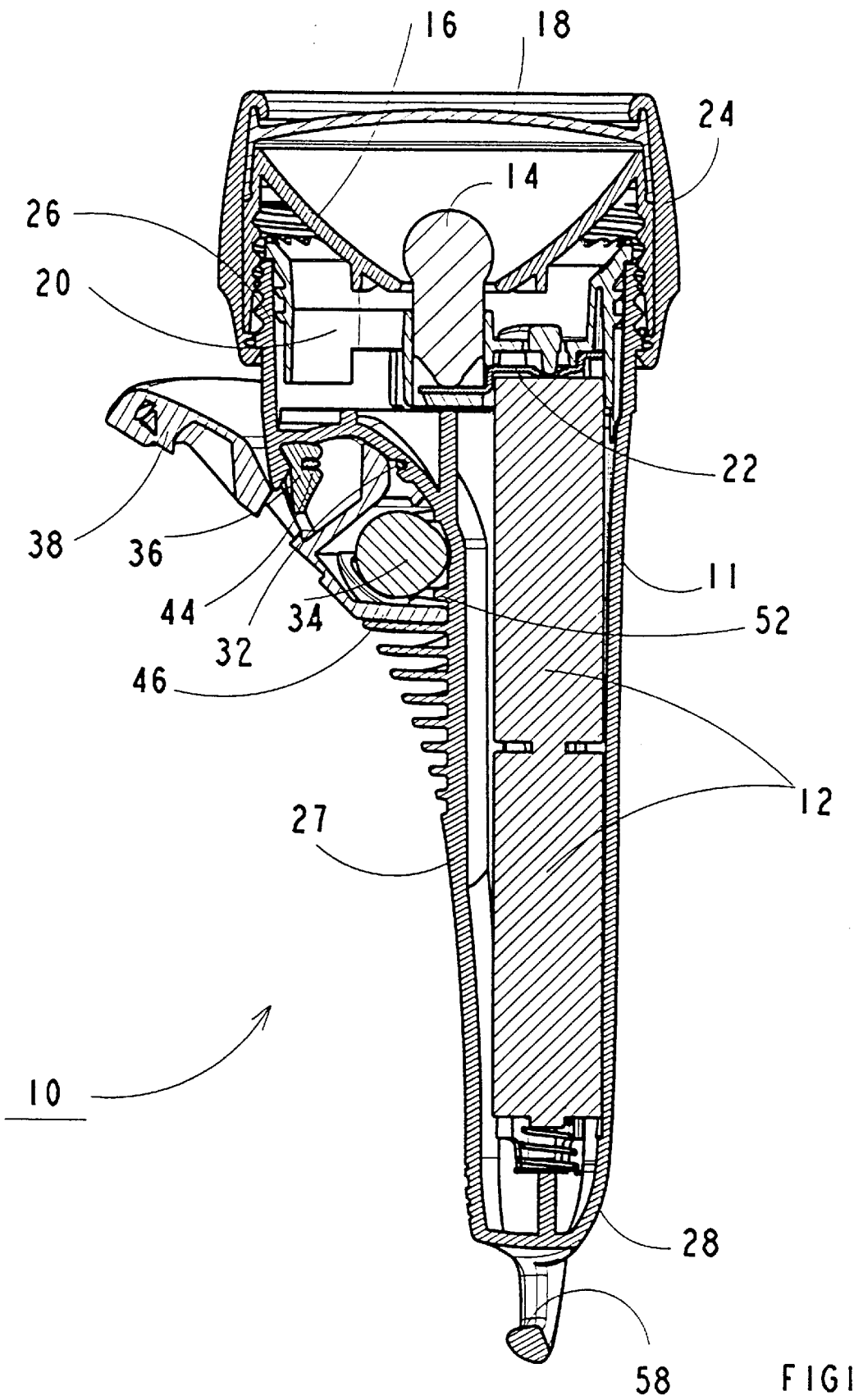
FIG. 1 is a cross-sectional view of the torch equipped with the fixing plate according to the invention.
Figure 2:
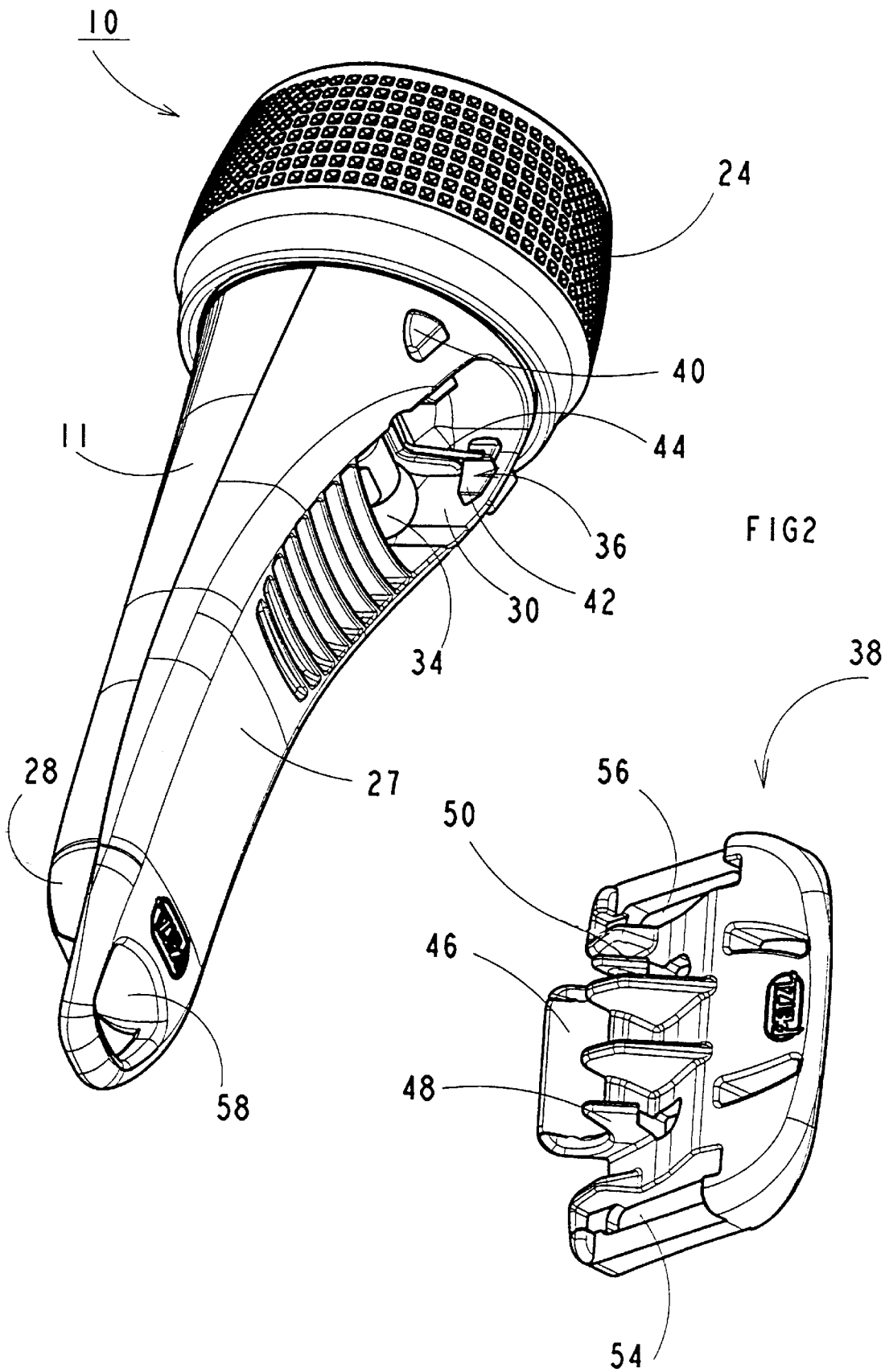
FIG. 2 is an exploded perspective view of the torch of FIG. 1, the fixing plate being represented in the unattached position.

In FIGS. 1 to 5, an electric torch 10 comprises an elongate case 11 made of insulating material containing power supply batteries 12 in the rear compartment and an electric bulb 14 associated in the front compartment to an assembly formed by a reflector 16 and transparent screen 18 for emission of the light beam. The bulb 14 is supported by an insulating support 20 equipped with a connection circuit 22 in electrical connection with the batteries 12 via a switch. The assembly formed by the reflector 16 and screen 18 is securedly affixed to a rotating ring 24 screwed onto a threaded end 26 of the case 11.

The end 26 of the case 11 presents a circular cross-section acting as housing for the support 20 of the bulb 14. The bottom lateral surface 27 of the case 11 extending between the end 26 and the base 28 presents a curved profile with a decreasing cross-section in the direction of the base 28. The bottom surface 27 of the case 11 is provided with a blind orifice 30 bounded by an internal protuberance 32 cast with the case 11. The orifice 30 advantageously contains a spare bulb 34 (FIG. 1) and locking means 36 enabling the torch to be fitted onto a fixing plate 38.

The locking means 36 comprise two securing buttons 40, 42 located on the two opposite sides of the orifice 30 and cooperating inside the orifice 30 with a U-shaped metal pin 44.

The fixing plate 38 comprises a support plate made of molded insulating material equipped with a positioning lug 46 and a pair of latching studs 48, 50 enabling the torch 10 to be clipped onto the securing buttons 40, 42 of the fixing plate 38.

In the latched position (FIG. 4) of the fixing plate 38, the two studs 48, 50 are held captive by the securing buttons 40, 42, which are urged to an active position by the elastic return action of the pin 44. This results in positive locking of the torch 10 on the fixing plate 38.

The fixing plate 38 comprises on the lateral sides two grooves 54, 56 designed to receive a band if the user wishes to use the torch as a head-lamp. The band is in this case fixed around the user's head and the torch protrudes out slightly in the middle zone above the head.

It is also possible to fit the fixing plate directly onto a helmet, or any other mobile element, for example a bicycle.

To uncouple the torch 10 from its fixing plate 38 (FIG. 3), it is necessary to push the buttons 40, 42 towards one another from the outside to obtain unlocking of the studs 48, 50 in the inactive position. The manual unlocking operation is performed against the return force of the elastic pin 44 and requires simultaneous pushing on both the buttons 40, 42.

Figure 3:
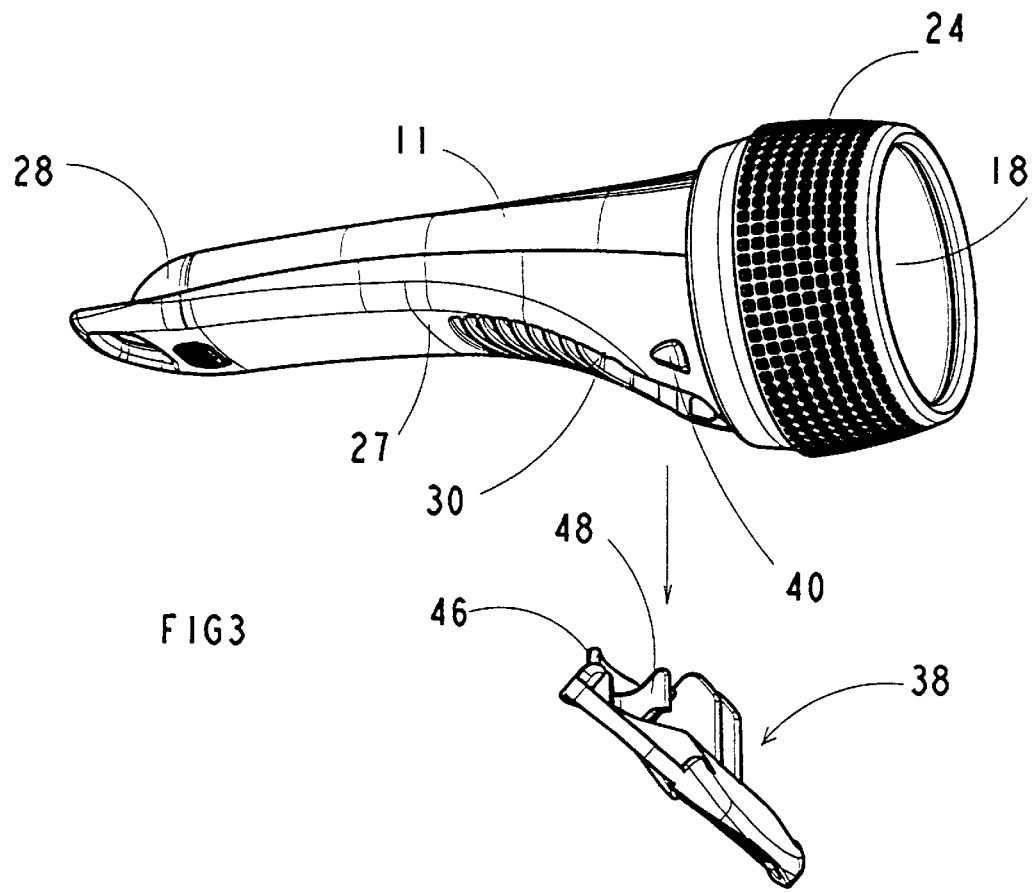
FIG. 3 is a profile view of FIG. 2, before the fixing plate is clipped onto the case.
Figure 4:
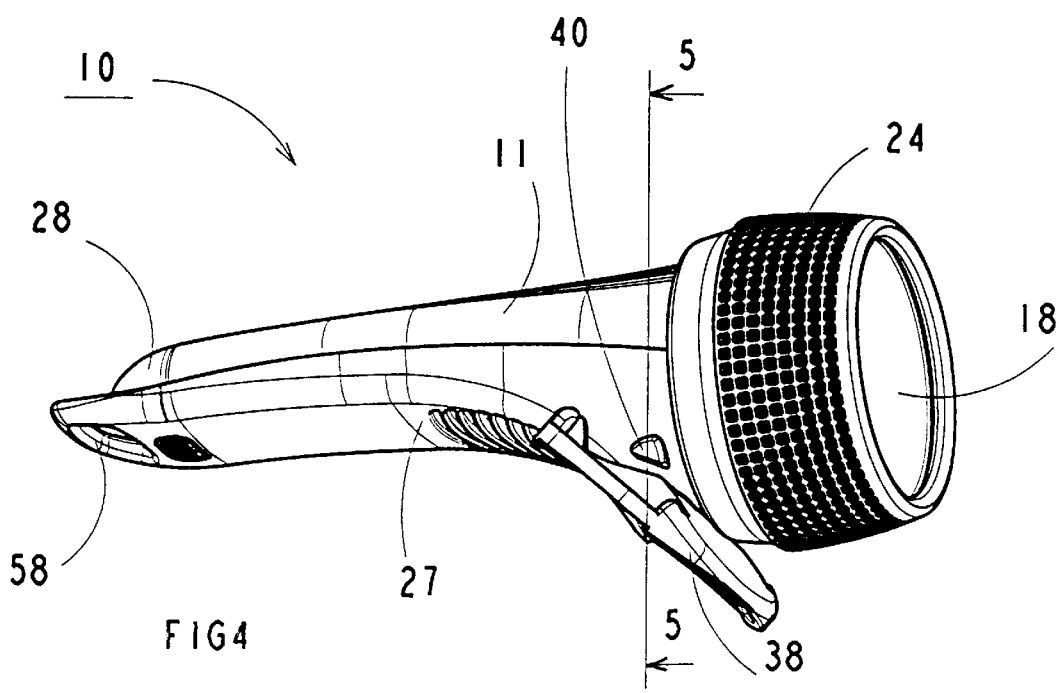
FIG. 4 is an identical view to FIG. 3, with the fixing plate in the attached position.
Figure 5:
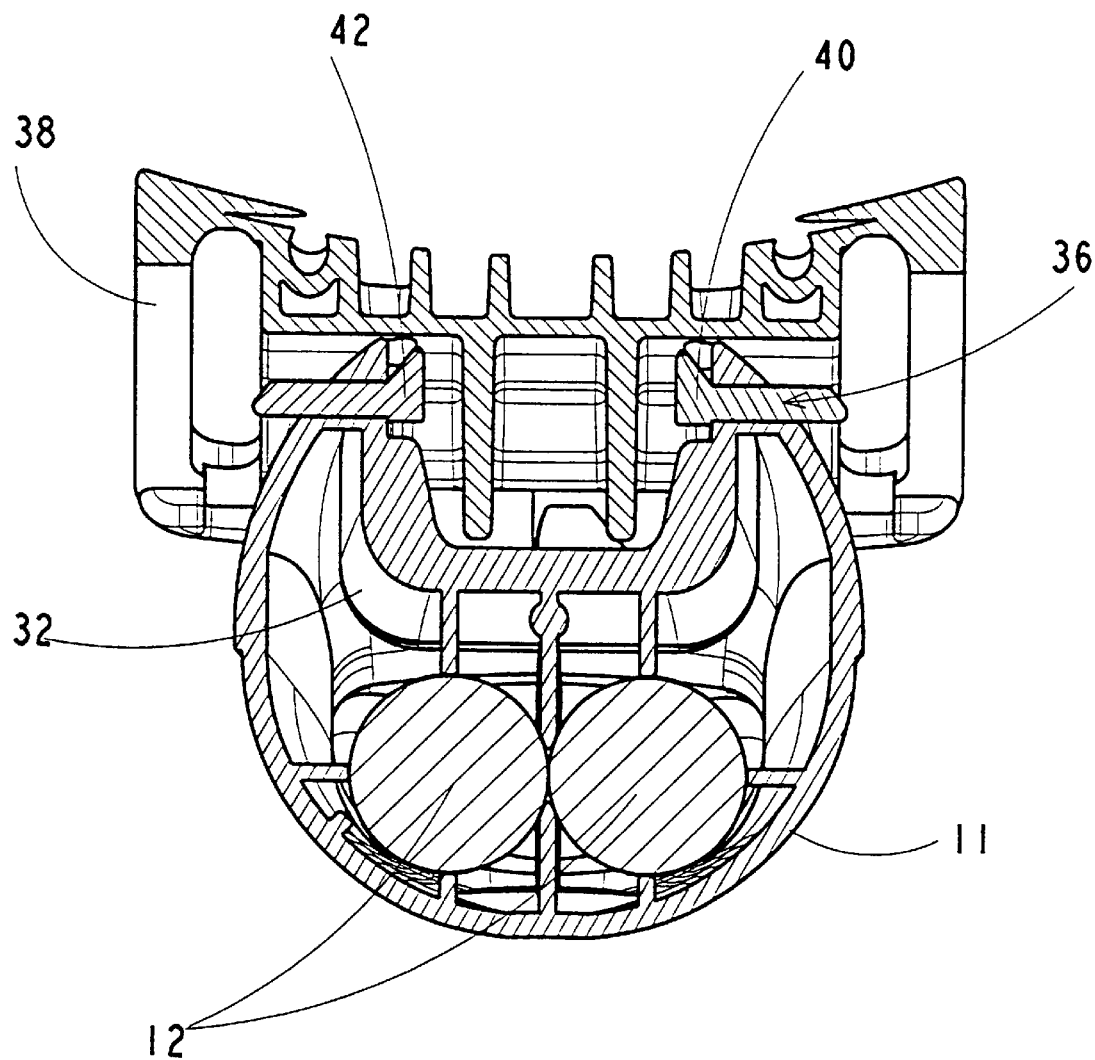
FIG. 5 represents a cross-sectional view along the line 5—5 of FIG. 4.

It is thus possible to quickly transform a head-mounted lamp into a hand-held torch after the fixing plate 38 has been unlocked (FIG. 3).

Figure 6:
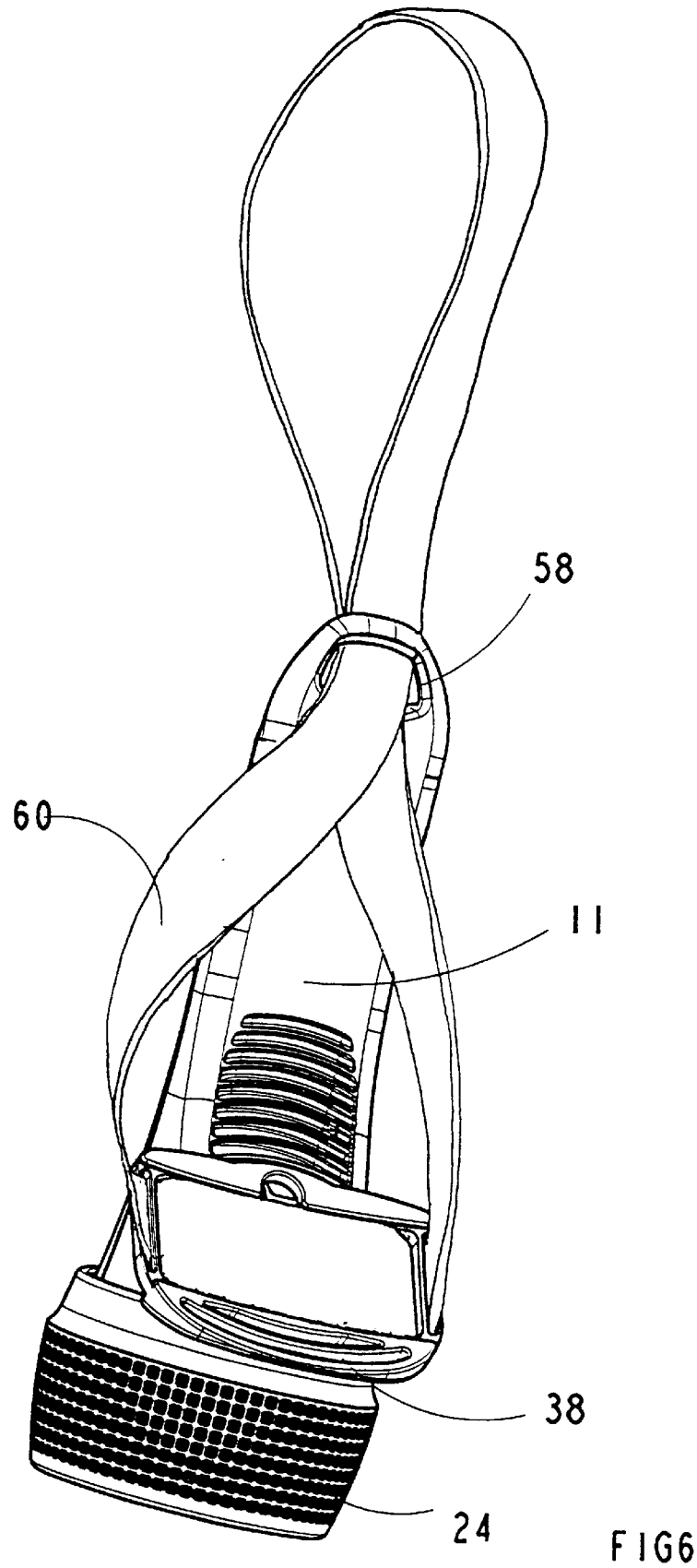
FIG. 6 shows a bottom view of FIG. 4, the fixing plate being equipped with a band arranged as a carrying strap.

The base 28 of the case 11 is moreover provided with a closed ring 58 for a band to pass through. In FIG. 6, the band 60 attached to the plate 38 advantageously passes through the ring 58 to constitute a carrying strap.

It is clear that the locking means 36 of the fixing plate 38 can be arranged differently without departing from the scope of the invention.

We claim:

1. An electric torch light comprising:
   an elongate case containing a current source to supply a bulb, said case comprising a base, and a bottom,
   a reflector and screen assembly securedly affixed to a rotating ring screwed onto a threaded end of the case opposite the base,
   and fixing means arranged on the bottom of the case to enable the torch light to be used as a head-mounted lamp, wherein:

the fixing means comprise a fixing plate designed to cooperate by clipping with locking means provided in a blind orifice of the case and arranged to constitute positive locking of the fixing plate in the active position, moving said locking means from the active position to the inactive position requiring a manual unlocking operation to uncouple the case from the plate, and the locking means comprise a pair of securing buttons located on the two opposite sides of the orifice and designed in said active position to block two latching studs securedly affixed to the fixing plate.

2. The torch light according to claim 1, wherein the fixing plate is equipped with a positioning lug arranged to facilitate clipping of the plate into the orifice.

3. The torch light according to claim 1, wherein the two latching studs are urged to the active position by a U-shaped metal pin arranged inside the orifice.

4. The torch light according to claim 1, wherein the bottom lateral surface of the case extending between the threaded end and the base presents a curved profile with a decreasing cross-section in the direction of the base.

5. The torch light according to claim 1, wherein the blind orifice of the case contains a spare bulb, said orifice being blanked off when the plate is clipped on.

6. The torch light according to claim 1, wherein the fixing plate comprises on the lateral sides two grooves designed to receive an attachment band, and the base of the case is provided with a closed ring enabling said band to be passed through to form a carrying strap.

* * * * *